(12) United States Patent
Lotti et al.

(10) Patent No.: US 10,480,183 B2
(45) Date of Patent: Nov. 19, 2019

(54) METHOD FOR MAKING FIRE-RESISTANT FOAM INSULATION PANELS

(71) Applicant: Dow Global Technologies LLC, Midland, MI (US)

(72) Inventors: Luca Lotti, Reggio Emilia (IT); Maurizio Guandalini, Bagnolo in Piano (IT); Luigi L. Bertucelli, Reggio Nell'emilia (IT); Paolo Golini, Reggio Emilia (IT)

(73) Assignee: Dow Global Technologies LLC, Midland, MI (US)

( * ) Notice: Subject to any disclaimer, the term of this patent is extended or adjusted under 35 U.S.C. 154(b) by 101 days.

(21) Appl. No.: 15/695,318

(22) Filed: Sep. 5, 2017

(65) Prior Publication Data

US 2017/0362820 A1 Dec. 21, 2017

Related U.S. Application Data

(62) Division of application No. 14/415,073, filed as application No. PCT/IB2013/002013 on Jul. 18, 2013, now Pat. No. 9,758,961.

(51) Int. Cl.
*E04B 1/80* (2006.01)
*B32B 17/04* (2006.01)
(Continued)

(52) U.S. Cl.
CPC ............ *E04B 1/806* (2013.01); *B29C 44/065* (2013.01); *B29C 44/1209* (2013.01);
(Continued)

(58) Field of Classification Search
CPC ... E04B 1/806; B29C 444/326; B29C 44/065; B29C 44/1209; B29C 44/30; B32B 17/04; B32B 15/095; B32B 15/14; B32B 15/12; B32B 15/08; B32B 15/043; B32B 5/32; B32B 5/26; B32B 15/20; B32B 27/065; B32B 27/12; B32B 29/007; B32B 29/02; B32B 5/245; B32B 15/046; B32B 7/12;
(Continued)

(56) References Cited

U.S. PATENT DOCUMENTS 3,554,851 A 1/1971 Modigliani
4,118,533 A 10/1978 Hipchen
(Continued)

FOREIGN PATENT DOCUMENTS

WO 2002-014397 A 2/2002
WO 2004-026948 A 4/2004
(Continued)

*Primary Examiner* — Brian Handville

(57) ABSTRACT

A continuous process for preparing insulation panels having thick (0.2 mm to 1 mm) metal facing panels and a fiber-reinforced polymer foam core is disclosed. In the process, a bottom metal facing panel is continuously supplied. A mat of reinforcing fibers and a foamable resin composition are applied to the bottom facing panel. A flexible barrier layer is applied atop the foamable resin composition, and the assembly is passed through nip rolls to compress the assembly and force the resin composition into the fiber mat. An adhesive layer and top metallic facing layer are then applied on top of the flexible barrier layer, and the resulting assembly is gauged and cured by passing it through a double band laminator.

8 Claims, 2 Drawing Sheets

(51) Int. Cl.
B32B 15/095 (2006.01)
B29C 44/30 (2006.01)
B32B 5/20 (2006.01)
B29C 44/06 (2006.01)
B29C 44/12 (2006.01)
B29C 44/32 (2006.01)
B32B 37/10 (2006.01)
B32B 38/00 (2006.01)
B32B 37/24 (2006.01)
B32B 5/24 (2006.01)
B32B 7/12 (2006.01)
B32B 15/04 (2006.01)
B32B 5/26 (2006.01)
B32B 5/32 (2006.01)
B32B 15/08 (2006.01)
B32B 15/12 (2006.01)
B32B 15/14 (2006.01)
B32B 15/20 (2006.01)
B32B 27/06 (2006.01)
B32B 27/12 (2006.01)
B32B 29/00 (2006.01)
B32B 29/02 (2006.01)
B32B 37/12 (2006.01)

(52) U.S. Cl.
CPC ............ *B29C 44/30* (2013.01); *B29C 44/326* (2013.01); *B32B 5/20* (2013.01); *B32B 5/245* (2013.01); *B32B 5/26* (2013.01); *B32B 5/32* (2013.01); *B32B 7/12* (2013.01); *B32B 15/043* (2013.01); *B32B 15/046* (2013.01); *B32B 15/08* (2013.01); *B32B 15/095* (2013.01); *B32B 15/12* (2013.01); *B32B 15/14* (2013.01); *B32B 15/20* (2013.01); *B32B 17/04* (2013.01); *B32B 27/065* (2013.01); *B32B 27/12* (2013.01); *B32B 29/007* (2013.01); *B32B 29/02* (2013.01); *B32B 37/1027* (2013.01); *B32B 37/24* (2013.01); *B32B 38/0004* (2013.01); *B32B 2037/1215* (2013.01); *B32B 2037/1253* (2013.01); *B32B 2038/0084* (2013.01); *B32B 2260/021* (2013.01); *B32B 2260/046* (2013.01); *B32B 2262/101* (2013.01); *B32B 2262/105* (2013.01); *B32B 2266/0278* (2013.01); *B32B 2305/10* (2013.01); *B32B 2307/304* (2013.01); *B32B 2307/718* (2013.01); *B32B 2307/72* (2013.01); *B32B 2307/7265* (2013.01); *B32B 2309/105* (2013.01); *B32B 2311/00* (2013.01); *B32B 2315/085* (2013.01); *B32B 2419/00* (2013.01); *B32B 2419/06* (2013.01); *B32B 2605/12* (2013.01); *B32B 2607/00* (2013.01); *Y10T 428/24999* (2015.04)

(58) Field of Classification Search
CPC . B32B 37/24; B32B 38/0004; B32B 37/1027; B32B 5/20; B32B 2037/1215; B32B 2266/0278; B32B 2605/12; B32B 2419/06; B32B 2307/304; B32B 2262/105; B32B 2260/046; B32B 2260/021; B32B 2262/101; B32B 2038/0084; B32B 2419/00; B32B 2307/72; B32B 2307/7265; B32B 2309/105; B32B 2037/1253; B32B 2315/085; B32B 2607/00; B32B 2305/10; B32B 2307/718; B32B 2311/00; Y10T 428/24999
See application file for complete search history.

(56) References Cited

U.S. PATENT DOCUMENTS

| | | |
|---|---|---|
| 4,292,369 A | 9/1981 | Ohashi |
| 4,311,801 A | 1/1982 | Skowronski |
| 4,366,203 A | 12/1982 | Briggs |
| 4,559,334 A | 12/1985 | Takaya et al. |
| 4,780,484 A | 10/1988 | Schubert |
| 6,030,559 A | 2/2000 | Leon |
| 2005/0257893 A1 | 11/2005 | Rueb |
| 2010/0003491 A1 | 1/2010 | Crostic |
| 2011/0293915 A1 | 12/2011 | Rub |

FOREIGN PATENT DOCUMENTS

| | | |
|---|---|---|
| WO | 2006-010697 A | 2/2006 |
| WO | 2008-134803 A | 11/2008 |
| WO | 2011-045131 A | 4/2011 |

METHOD FOR MAKING FIRE-RESISTANT FOAM INSULATION PANELS

This invention relates to methods for making foam composite panels having metallic facing sheets.

Insulation panels are widely used to provide thermal insulation to homes, buildings, cold-storage facilities, ships and other constructions. One type of insulation panels includes a polymeric foam core and metallic sheet facing panels. Constructions of this type can offer a good combination of thermal insulation, mechanical strength and fire resistance. For several reasons, it might be desirable to include a fiber reinforcement within the polymer foam layer. The fiber reinforcement can enhance both the panel's physical properties and its performance in fire tests.

Various processes can be used to make insulation panels. Different processes are used depending on the type of facings and core materials. It is known to make insulation panels in a single continuous process when the faces are very thin, flexible materials. Continuous manufacture becomes more difficult when the panel includes two thicker metallic facing panels, especially when the polymeric core is also to be fiber-reinforced. It becomes difficult to impregnate the fibrous reinforcement with the polymeric foam, expand the foam and apply the facing sheets in a single operation. Because of this, the manufacture of these panels is broken into separate manufacturing processes. This increases equipment and operating costs. A more efficient and economical process for manufacturing these panels is needed.

This invention is a continuous process for preparing a foam laminate having metallic facing sheets, comprising
   a) continuously feeding a bottom metallic facing sheet that includes a metal layer having a thickness of 0.2 to 1.0 mm onto a moving surface;
   b) continuously applying a fiber mat and a curable, foamable resin composition onto the moving bottom metallic facing sheet;
   c) prior to fully expanding the foamable resin composition, continuously applying a layer of a flexible barrier material on top of the fiber mat and foam-forming resin composition;
   d) prior to fully expanding the foamable resin composition, continuously passing the bottom metallic facing layer, fiber mat, resin composition and flexible barrier material through a constricted region to compress the bottom metallic facing layer, fiber mat, resin composition and flexible barrier material together such that the resin composition becomes pushed into and impregnates the fiber mat, and the flexible barrier material is contacted with the resin composition;
   e) then continuously applying a layer of an adhesive layer on top of the layer of the flexible barrier material;
   f) then continuously applying a top metallic facing sheet that includes a metal layer having a thickness of 0.2 to 1.0 mm on top of the adhesive layer and
   g) passing the resulting assembly through a double band laminator to contact the top metallic facing sheet with the adhesive layer, gauge the assembly to a predetermined thickness and to cure the resin composition, the adhesive layer, or both the resin composition and adhesive layer, to form the foam laminate.

This process allows for the manufacture of insulations panels with two metallic facing layers and a fiber-reinforced polymeric foam core, in a single, continuous operation. The process allows for good impregnation of the fiber mat with the curable, foamable resin composition, which leads to good fiber reinforcement of the polymer foam layer and which in turn leads to good mechanical properties. This process therefore requires less equipment, involves smaller operating costs, and produces a product that has both excellent thermal insulation capacity and excellent fire resistance as indicated by standardized fire tests.

The product of the inventive process is an insulation panel containing at least the following layers: a bottom metallic facing sheet that includes a metal layer having a thickness of 0.2 to 1.0 mm; a polymeric foam layer reinforced through at least a portion of its thickness with a fiber mat, said polymeric foam layer being adhered directly or indirectly to the bottom metallic sheet; a layer of a flexible barrier material adhered to the fiber-reinforced polymeric foam layer; an adhesive layer adhered to layer of the substantially flexible barrier material and a top metallic facing sheet having a thickness of 0.2 to 1.0 mm adhered to the layer of flexible barrier material by the adhesive layer. Various optional layers can be inserted into the process, as described more fully below.

Figure 1:
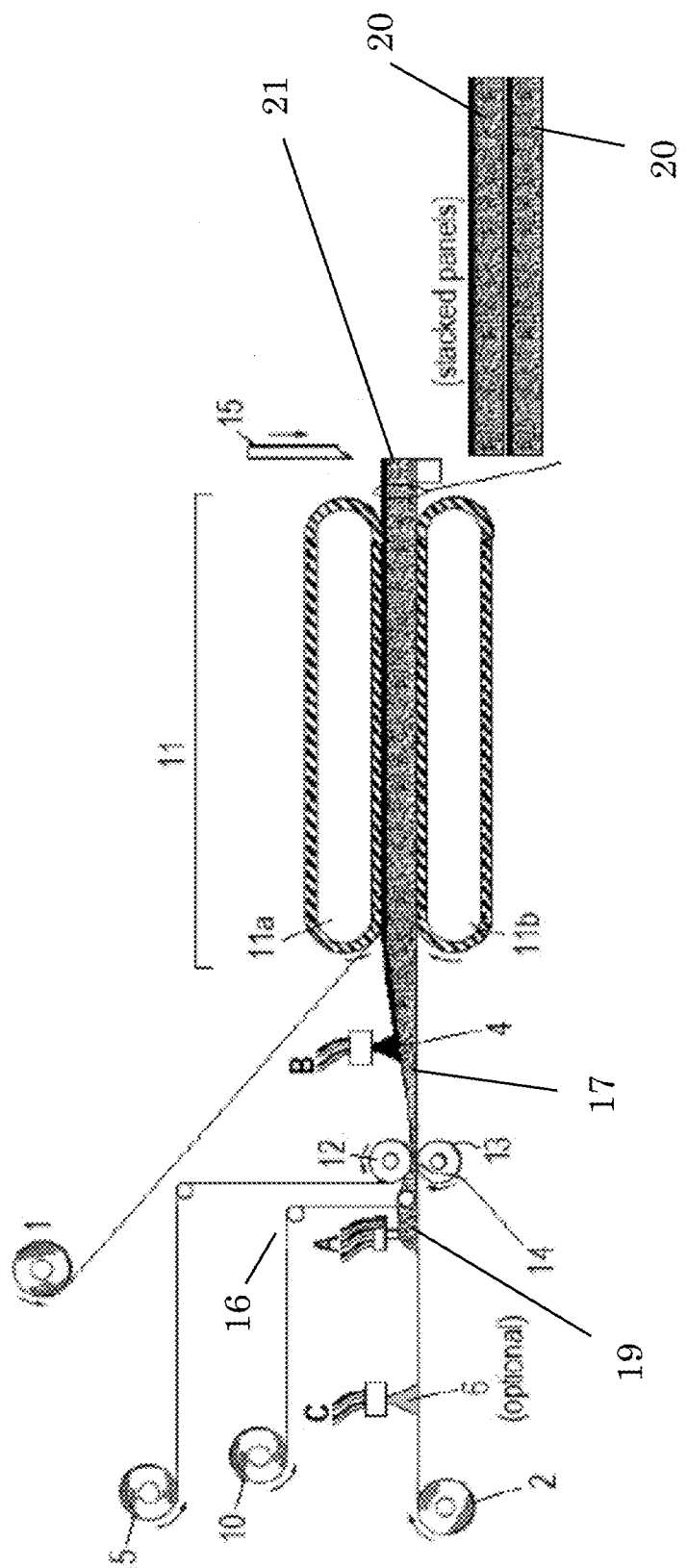
FIG. 1 is a schematic drawing of an embodiment of the process of the invention.

Turning to FIG. 1, bottom metallic facing sheet 2 is continuously fed to form a moving bottom facing sheet onto which subsequently-introduced materials are deposited. Bottom metallic facing sheet 2 can be fed and moved using various types of mechanical equipment. For example, metallic facing sheet 2 can be fed onto a moving platform such as an endless belt, a series of driven rollers, a tenter frame or other apparatus. Metallic facing sheet 2 can be pulled through the process by double band laminator 11, or through some other downstream pulling device (not shown).

Figure 3:
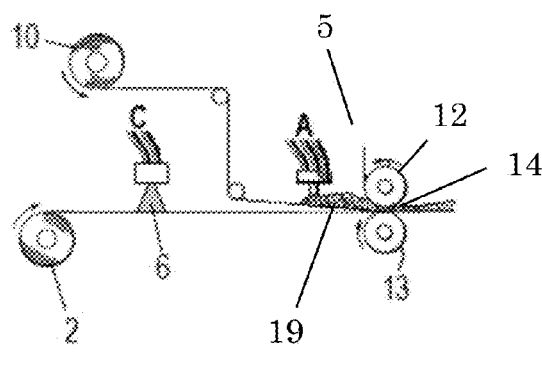
FIG. 3 is a schematic drawing of an alternative embodiment of a portion of the process of the invention.
Figure 4:
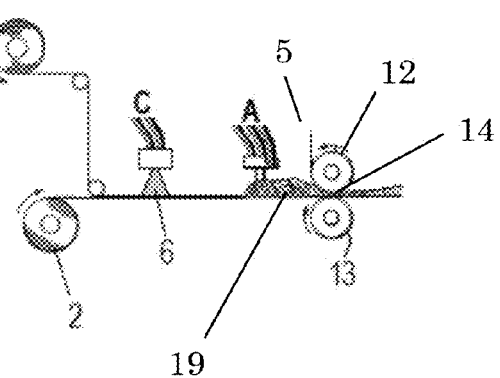
FIG. 4 is a schematic drawing of a second alternative embodiment of a portion of the process of the invention.

Fiber mat 10 and curable, foamable resin composition 19 are applied onto moving bottom metallic facing sheet 2. In the embodiment shown, resin composition 19 is deposited upstream of fiber mat 10. However, as shown in FIGS. 3 and 4, it is also possible to deposit resin composition 19 downstream of fiber mat 10. It is also possible to deposit fiber mat 10 and resin composition 19 at the same point in the process.

Fiber mat 10 can be deposited using any suitable equipment, including a series of rollers 16 as shown in FIG. 1. Once deposited, fiber mat 10 can be carried through the process by metallic facing sheet 2, or pushed and/or pulled through the process together with metallic facing sheet 2.

Curable, foamable resin composition 19 similarly can be deposited using a variety of types of dispensing equipment including types well-known in the art. Suitable equipment includes, for example, a traversing hose, one or more stationary mix heads, one or more spray nozzles, or other suitable apparatus for dispensing a fluid. In FIG. 1, such dispensing equipment is generally indicated by reference symbol A. The equipment for depositing the curable, foamable resin composition also may include various tanks or other containers for storing components of the resin composition, metering means for metering those components and/or the formulated resin composition; mixing means for mixing the components to form the resin composition, pumping means for transferring the components of the resin composition from their respective storage containers to and through the mixing means and/or through the dispensing apparatus. Suitable equipment for mixing and dispensing the components of curable, foamable resin compositions are available commercially from, for example, Cannon, SAIP and Krauss Maffei.

If desired, the dispensed resin composition may be formed into a layer and/or gauged at this point in the process using equipment such as, for example, a set of nip rolls or a doctor blade.

Turning again to FIG. 1, a layer of substantially non-porous flexible material 5 is continuously applied on top of fiber mat 10 and resin composition 19. Flexible material 5 is applied before resin composition 19 has fully expanded. Resin composition 19 often begins to react and expand as soon as it is deposited, and may be expanding in some cases even as it is deposited. Accordingly, foamable resin composition 19 may already be partially expanded when flexible material 5 is applied, as shown in FIG. 1. Slower-reacting resin compositions may not have expanded measurably at this point. In any event, flexible material 5 is to be deposited before resin composition 19 has fully expanded.

The resulting assembly including bottom metallic facing layer 2, fiber mat 10, resin composition 19 and flexible material 5 is then passed continuously through constricted region 14. This step is performed before foamable resin composition 19 has fully expanded. Constricted region 14 has a height no greater than and preferably slightly (such as 2 to 25%) less than the combined height of the various layers immediately before they enter constricted region 14. Therefore, bottom metallic facing layer 2, fiber mat 10, resin composition 19 and flexible material 5 are compressed together in constricted region 14. As the materials pass through constricted region 14, resin composition 19 becomes pushed into fiber mat 10 and impregnates fiber mat 10, and the bottom side flexible material 5 is brought into contact with resin composition 19.

In the embodiment shown in FIG. 1, constricted region 14 is defined by rollers 12 and 13, which are set apart at a predetermined distance which in turn defines the height of constricted region 14.

The assembly exiting constricted region 14 includes layer 17 of fiber mat 10 impregnated with resin composition 19 (which may be partially expanded). Layer 17 is sandwiched between bottom metallic facing layer 2 and flexible material 5. Because flexible material 5 acts as a barrier layer, resin composition 19 is in contact with the bottom surface thereof but does not penetrate therethrough, and for that reason does not contact roller 12 or other mechanical device that defines constricted region 14.

After the assembly exits constricted region 14, adhesive layer 4 is continuously applied on top of flexible material 5. Various types of dispensing, mixing, metering, spreading and/or gauging equipment can be used to form adhesive layer 4, including those types described above with regard to resin composition 19. In FIG. 1, this dispensing equipment is indicated generally by reference symbol B. Resin composition 19 may be unexpanded, partially expanded or fully expanded at the point adhesive layer 4 is applied. In the embodiment shown in FIG. 1, resin composition 19 has only partially expanded at the point at which adhesive layer 4 is introduced.

Prior to applying top metallic facing layer 1, resin composition 19 may be at least partially expanded and/or partially cured. Partial curing can help the expanding resin composition support the weight of top metallic facing sheet 1. The expansion can occur before, during and/or after the adhesive layer 4 is applied, as already described. Similarly the curing (which typically proceeds simultaneously with the expansion but may partially follow the expansion step) can be performed before, or preferably during or after the step of applying adhesive layer 4. Quite often, particularly when resin composition 19 is isocyanate-based, the generation of expanding gas and therefore the expansion step itself forms part of the curing reaction and in such a case will occur at least partially simultaneously with the curing step, although some additional curing reactions may continue after the blowing gas has been generated and the expansion has been completed. It may not be necessary to fully cure resin composition 19 before applying top metallic facing layer 1, if the partially cured and expanded resin composition 19 can support the weight of top metallic facing layer 1.

Top metallic facing sheet 1 is continuously applied atop adhesive layer 4. The manner of delivering top metallic facing sheet 1 is not particularly critical. A wide range of mechanical devices can be used to apply top metallic facing sheet 1, including any of those described with respect to bottom metallic facing sheet 2.

If top metallic facing sheet 1 is profiled, adhesive layer 4 may fill the recessed areas of the facing sheet to level the bottom surface thereof.

The resulting assembly is thereafter passed continuously through double band laminator 11 to contact top metallic facing sheet 1 with adhesive layer 4, gauge the assembly to a predetermined thickness and if necessary to complete the cure of resin composition 19 and/or adhesive layer 4, to form foam laminate 20. Upon curing, resin composition 19 forms polymeric foam layer 21, which is reinforced through at least a portion of its thickness by fiber mat 10. The gauge (i.e., the distance between the top band 11a and bottom band 11b of laminator 11) defines the panel thickness. As the assembly passes through laminator 11, top band 11a exerts a small downward force on top metallic facing layer 1 to contact it with adhesive layer 4 and bond it thereto. The expanded resin composition may be somewhat compressed in this step, but the pressure should not be so great as to collapse the foam or to create a large back-pressure. If adhesive layer 4 and optional adhesive layer 6 (as described below) requires a thermal cure, it is preferred that this thermal cure occurs at least partially during this laminating step, to bond top metallic facing layer 4 to reinforced foam layer 21. Heat may be applied through either or both surfaces if needed to drive the cure of resin composition 19 and/or adhesive layer 4.

The resulting laminate 20 is continuously expelled from the back end of double band laminator 11. Laminate 20 typically is then cut to any desired length (such as by knife 15 or, preferably a band or circular saw), post-cured if necessary or desirable, and packaged for warehousing and/or shipment.

Top metallic facing layer 1 and bottom metallic facing layer 2 each are single or multi-layer materials that include at least one metallic layer having a thickness of 0.2 to 1.0 mm. The metallic layer may be any metal that is solid at the operating temperatures, but preferred metals for this purpose are steel, stainless steel, aluminum, nickel, zinc, titanium, bronze, copper, brass, magnesium, and various alloys of any of these. Steel is most preferred on the basis of low cost and desirable mechanical properties. The metallic layer may be planar, but can also be profiled (for example, grooved or channeled along its length). The metallic layer may be surface treated such as by corona discharge to improve its ability to bond to adhesive layer 4. The metallic layer also may be heated prior to introduction into the process of the invention. The profiling, surface treating and/or heating steps may be integrated into the inventive process.

The metallic layer may be the sole component of the metallic facing layers. Alternatively, either or both of the metallic facing layers may be laminates that contain one or more layers of other materials, such as, for example, paper, a protective coating, a paint, a decorative veneer, and the like. A lacquered steel panel is particularly suitable as the metallic facing layers. Top metallic facing layer 1 and bottom metallic facing layer 2 may be the same as or different from each other.

The fiber mat may be, for example, aligned continuous fibers; continuous rovings; randomly-oriented short (15 cm or less in length), or long fibers. It is preferred that the fibers in the fiber mat are at least partially carried upward as the foamable resin composition expands and cures, so the fiber reinforcement extends throughout the thickness of the foam core layer that is formed when the resin composition forms. Therefore, although the fibers of the fiber mat can in some embodiments be mechanically bonded (such as through entanglement, stitching and/or needlepunching), thermally bonded and/or adhesively bonded, woven or knitted, in a preferred mat the fibers preferably are not thermally or adhesively bonded and are at most lightly entangled, so the fibers can move easily with respect to each other and at least some of then can be carried upward with the expansion of the resin composition. The fibers preferably are made from a material that is thermally stable at the temperatures encountered during the panel manufacturing process and are stiffer than the polymeric foam material. Glass is a preferred type of fiber, but other types such as other ceramic materials (including, mineral wool, boron nitride, silicon nitride, and the like), metal, carbon, high-melting polymeric fibers, and natural fibers such as wool, cotton, jute, hemp or silk are useful. Glass fibers are preferred on the basis of cost, availability and generally good performance. A preferred fiber mat weight may weigh, for example, from 20 to 80 g/m$^2$. The fiber mat may be provided in the form of two or more stacked layers. The total thickness of the fiber mat(s) (prior to any expansion during the curing of the resin composition) may be, for example, from 3 to 10 mm.

Curable, foamable resin composition 19 is a mixture of polymer precursors and blowing agents and/or blowing agent precursors that react in the process to produce a cellular polymer foam. Curable, foamable resin composition 19 preferably is formulated to produce a foam having a free rise density of 16 to 320 kg/m$^3$, more preferably 24 to 80 kg/m$^3$. "Free-rise" density is determined by curing a sample of the resin composition without constraining its expansion in the vertical direction and in the absence of the fiber mat, and measuring the density of the foam so produced. The cellular polymer foam so produced preferably is a rigid foam.

Isocyanate-based resin compositions are highly preferred because these compositions can be formulated to be low in initial viscosity, which favors easy penetration of the composition into the interstices between the fibers in the fiber mat, and because isocyanate-based resin compositions can be formulated to expand and cure rapidly to form a polymer foam having useful properties. The isocyanate-based resin compositions may be formulated to produce a polymer having urethane groups, urea groups and/or isocyanate groups. An especially preferred type of isocyanate-based resin composition is a polyisocyanurate or polyurethane-polyisocyanurate foam-forming composition, as foams of these types exhibit an excellent combination of high thermal insulation and excellent strength-to-weight ratio.

Suitable isocyanate-based resin compositions are well-known. Those described, for example, in WO 2010/114703 and WO 2007/02588, are suitable. In general, the isocyanate-based resin composition will include at least one polyisocyanate compound, at least one blowing agent, at least one polyol and at least one catalyst for the reaction of the isocyanate groups with themselves (to produce isocyanurate groups) and/or with isocyanate-reactive materials in the composition (such as polyols and any water as may be present).

The layer of flexible barrier material prevents the curable, foamable resin composition from contacting the equipment used to form constricted region 14. It is therefore either non-porous or, if it has pores or openings, those pores or openings are small enough that they do not allow the curable, foamable resin composition to permeate through the flexible barrier material during the process. By "flexible", it is meant that the composition and thickness of the sheet are such that it can be reversibly bent to a bend radius of 1 inch (2.54 cm) or less, preferably of 0.25 inch (6.25 mm) or less, without permanent damage or distortion. The flexible material preferably is thermally stable under the conditions of the process of the invention, and does not dissolve in or become degraded by the curable, foaming resin composition.

A variety of materials are useful as the flexible barrier material. Among these are paper; polymer films and/or polymer foams including thermoplastic polymer films and foams such as polyolefin, polyester, poly(vinylidene chloride), polyamide, polycarbonate, polyurethane; metal foils such as aluminum foil, and the like; and woven or non-woven fabrics. The flexible barrier material may be a multi-layer structure containing two or more layers, of which at least one forms a barrier to the passage of the resin composition. For example, the flexible barrier material may include a porous layer bonded to a non-porous layer. An example of such a flexible barrier material includes a layer of a cellular polymer, granular material or fibrous material, or other porous material bonded to a non-porous layer such as paper sheet, a polymer film layer or the like. A preferred type of flexible barrier material is a multi-layer structure including a layer of a glass or other ceramic fiber bonded on one or both sides with a non-porous layer such as paper or a polymer film. An especially preferred type of flexible barrier material is a layer of mineral wool bonded on one or both sides to a paper layer.

The layer of flexible barrier material may have a thickness of, for example, 20-100 mm.

Adhesive layer 4 can be, for example, a hot-melt adhesive or, preferably, a curable type such as an epoxy adhesive or isocyanate-based adhesive. Suitable epoxy adhesives are well-known and described, for example, in WO 2006/093949 and WO 2006/052726. These epoxy adhesives include an epoxy resin, a hardener and at least one epoxy curing catalyst. Suitable polyurethane and polyurethane-polyisocyanurate adhesives also are well-known and described, for example, in WO 2011/045139. Polyurethane and polyurethane-polyisocyanurate adhesives include at least one polyisocyanate compound, at least one polyol, aminoalcohol or polyamine, and, preferably at least one catalyst for the curing reaction. If polyisocyanurate groups are to be formed, the adhesive preferably includes a catalyst for the trimerization of isocyanate groups as well as a catalyst for the reaction of isocyanate groups towards hydroxyl groups. An epoxy or polyurethane adhesive can be formulated as a one-component or two-component adhesive.

The adhesive layer 4 may contain an inorganic filler, which may be included to reduce cost, adjust its physical properties, provide a thermal barrier, provide additional flame retardance and/or act as an intumescent agent.

Expandable graphite is an example of an inorganic filler that acts as an intumescent agent. The adhesive layer 4 preferably is non-cellular or if cellular has a density of at least 150 kg/m$^3$, more preferably at least 400 kg/m$^3$, especially at least 700 kg/m$^3$.

Figure 2:
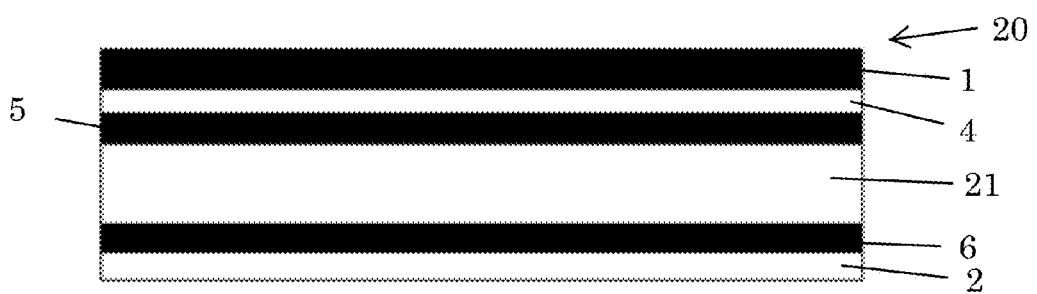
FIG. 2 is a cross-sectional view of an embodiment of an insulation panel produced in accordance with the invention.

Turning to FIG. 2, insulation panel 20 prepared in accordance with the invention includes bottom metallic facing layer 2, polymeric foam layer 21 (which is produced by the expansion and cure of resin composition 19 and is reinforced with fiber mat 10 through at least a portion of its thickness), flexible layer 5, adhesive layer 4 and top metallic facing layer 1. Adhesive layer 4 bonds flexible layer 5 to top metallic facing layer 1. Flexible layer 5 is bonded directly to polymeric foam layer 21. In the embodiment shown in FIG. 2, optional adhesive layer 6 bonds polymeric foam layer 21 to bottom metallic facing layer 2, although adhesive layer 6 can be omitted, in which case polymeric foam layer 21 is bonded directly to bottom metallic facing layer 2. Fiber mat 10 may extend through as little as 10% to as much as 100% of the thickness of polymeric foam layer 21, but preferably extends through at least 50% of the thickness of polymeric foam layer 21. For purposes of better illustration, the thicknesses of the various layers are not drawn to scale in FIG. 2.

Insulation panel 20 preferably has a thickness of 25 to 250 mm. The reinforced foam layer may have a thickness from 5 to 240 mm.

In some embodiments, an optional adhesive layer can be interposed between bottom metallic facing 2 and reinforced foam layer 21. Such an optional adhesive layer is indicated with reference numeral 6 in FIGS. 1, 3 and 4. Optional adhesive layer 6 can be, for example, a hot-melt adhesive or, preferably, a curable type such as an epoxy adhesive or isocyanate-based adhesive, as described with respect to adhesive layer 4. If adhesive layer 6 is present, it can be the same as or different from adhesive layer 4.

In the embodiment shown in FIG. 1, optional adhesive layer 6 is applied using apparatus indicated by reference symbol C, directly to bottom metallic facing layer 2, upstream of the point at which the resin composition 19 and fiber mat 10 are introduced. If metallic facing sheet 1 is profiled, adhesive layer 6 may fill the recessed areas of the facing sheet to level the top surface thereof. In alternative embodiments, the order in which optional adhesive layer 6, fiber mat 10 and resin composition 19 are introduced can be varied. Apparatus C is generally as described before with respect to apparatus A and B.

In the alternative embodiment shown in FIG. 3, optional adhesive layer 6 is applied to bottom metallic facing 2, then fiber mat 10 is applied directly atop optional adhesive layer 6, followed by resin composition 19 and flexible barrier material 5, before passing the materials through constricted region 14 defined by rollers 12 and 13.

In the alternative embodiment shown in FIG. 4, fiber mat 10 is laid directly onto bottom metallic facing 2, followed by optional adhesive layer 6, then by resin composition 19 and flexible barrier material 5, before passing the materials through constricted region 14 defined by rollers 12 and 13.

In the alternative embodiments shown in FIGS. 3 and 4, fiber mat 10 may become partially impregnated with adhesive layer 6, in addition to become partially impregnated by resin composition 19. Adhesive 6 should be thinner than fiber mat 10, so at least a portion of fiber mat 10 extends out of adhesive layer 6 and becomes impregnated with resin composition 19, so that the resulting foam layer 21 is reinforced by fiber mat 10 through at least a portion of its thickness, as described before.

The foam laminates of the invention can be used in a variety of structural, thermal insulation and/or decorative applications. They can be used as materials of construction for interior or exterior walls, ceilings and roofing materials for buildings; as decorative and/or façade materials, ducting system panels, walls and ceilings in buildings; as thermal insulation panels for buildings and various types of cold-storage facilities. The laminates can be used as deckings for ships and other transport vehicles. These foam laminates can in general be used in the same applications and in the same manner as conventional panels.

What is claimed is:

1. An insulation panel comprising the following layers: a bottom metallic facing sheet 2 that includes a metal layer having a thickness of 0.2 to 1.0 mm; a polymeric foam layer 21 reinforced through at least a portion of its thickness with a fiber mat 10, said polymeric foam layer 21 being adhered directly or indirectly to the bottom metallic sheet 2; a layer of a flexible barrier material 5 adhered to the fiber-reinforced polymeric foam layer 21; an adhesive layer 4 adhered to the flexible barrier material 5 and a top metallic facing sheet 1 having a thickness of 0.2 to 1.0 mm adhered to the layer of flexible barrier material 5 by the adhesive layer 4, where the flexible barrier material 5 is a layer of mineral wool bonded on one or both sides to a non-porous paper layer.

2. The insulation panel of claim 1, wherein fiber mat 10 has a weight of 20 to 80 g/m$^2$.

3. The insulation panel of 2, wherein fiber mat 10 is a mat of glass fibers.

4. The insulation panel of claim 3, wherein the layer of flexible barrier material 5 has a thickness of 20 to 100 mm.

5. The insulation panel of claim 3, wherein top metallic facing sheet 1 is steel and the metal layer of bottom metallic facing sheet 2 is steel.

6. The insulation panel of claim 3, further comprising a layer of adhesive 6 between bottom metallic sheet 2 and polymeric foam layer 21.

7. The insulation panel of claim 3, wherein polymeric foam layer 21 has a thickness of 20 to 240 mm.

8. The insulation panel of claim 3, which has a thickness of 25 to 250 mm.

* * * * *